United States Patent [19]

Clark et al.

[11] Patent Number: 4,736,362
[45] Date of Patent: Apr. 5, 1988

[54] PROGRAMMABLE DATA-ROUTING MULTIPLEXER

[75] Inventors: Alan T. Clark, Austin, Tex.; Arthur F. Lange, Sunnyvale, Calif.

[73] Assignee: Advanced Micro Devices, Inc., Sunnyvale, Calif.

[21] Appl. No.: 759,624

[22] Filed: Jul. 26, 1985

[51] Int. Cl.$^4$ .............................................. H04Q 11/04
[52] U.S. Cl. ................................... 370/58; 340/825.52
[58] Field of Search ................ 370/58, 85, 112, 110.1; 340/825.5, 825.51, 825.52

[56] References Cited

U.S. PATENT DOCUMENTS

| | | | |
|---|---|---|---|
| 4,547,877 | 10/1985 | Lehman et al. | 370/58 |
| 4,589,107 | 5/1986 | Middleton et al. | 370/58 |
| 4,689,783 | 8/1987 | Kaczerowski | 370/58 |

Primary Examiner—Douglas W. Olms
Assistant Examiner—Frank M. Scutch, III
Attorney, Agent, or Firm—Patrick T. King; Kenneth B. Salomon

[57] ABSTRACT

A multiplexer for use in a digital subscriber controller having a number of analog ports and digital ports which can be programmed via an external microprocessor to establish time-division multiplexed bidirectional data paths between three subscriber-selected ports designated as "sources" and three subscriber-selected ports designated as "destinations". Among the ports is a line-interface port having two 64 kilobit-per-second channels on which analog/digital data is received from and transmitted onto the network transmission line. Among the digital ports is a three-channel serial port and a two-channel microprocessor interface port. An analog port is also provided at which a variety of audio transducers may be connected. The data-routing multiplexer consists of three sections, each comprising a plurality of registers connected to a single internal bus on which time-division-multiplexed signals are generated and received by particular subscriber-selected registers, each register within a section serving as either a generator or a receiver for the internal bus for a particular digital channel. An extension of the internal bus is connected to the analog port. A set of three control registers stores the subscriber-selected sources and destinations. Control signals are generated therefrom which affect the subscriber-selected interconnection of registers within the data-routing multiplexer with the internal bus. The multiplexer facilitates maintenance and testing of the digital subscriber controller by permitting a loopback path to be established for a device connected to a port by simply designating a path having that port as both its source and destination.

8 Claims, 9 Drawing Sheets

PROGRAMMABLE DATA-ROUTING MULTIPLEXER

CROSS REFERENCE TO RELATED APPLICATION

Related, copending application of particular interest to this invention is application Ser. No. 759,622 now U.S. Pat. No. 4,635,255 on behalf of Alan T. Clark, Hud, I Brahim and Arthur F. Lange entitled "Digital Subscriber Controller", assigned to the assignee of the instant application.

BACKGROUND OF THE INVENTION

Telephonic subscriber lines today are increasingly employing all-digital networks for both voice and data transmission so as to provide the utmost in signal integrity and flexibility inherent in digital networks. Further benefits accorded to the subscriber include the more efficient provision of existing and new services, such as telephony, packet- and circuit-switched data, telemetry, electronic mail, alarm signaling, telex, facsimile, and banking transactions over the same medium, thereby greatly reducing equipment and space requirements. Additionally, benefits accrue to the telephone company in terms of increased revenue derived from the provision of these new services, and simplified management resulting from all services operating on a single (digital) network.

To provide an interface to such all-digital voice/data networks on the subscriber's premises, the prior art employs discrete and/or expensive custom circuitry which lacks the flexibility to meet changing subscriber needs. Furthermore such circuitry encourages proliferation of incompatible implementations which vary in physical, electrical and line protocol characteristics. Additionally, the prior art interfaces occupy large amounts of space, have high power consumption thereby generating considerable heat which requires cooling apparatus and lack the reliability of monolithic integrated circuitry.

SUMMARY OF THE INVENTION

The programmable data-routing multiplexer provided by the instant invention allows the subscriber ready-access to the various data-handling facilities provided by all-digital voice/data telecommunication networks. The multiplexer is intended for use in a subscriber controller which can be programmed by the subscriber via an external 8-bit microprocessor to perform a number of functions by giving simultaneous access to two 64-kilo-bit per second (kbs) voice/data channels and a 16-kbs data control channel. Voice-band signals are digitized at the subscriber's terminal and transmitted over one of the 64-kbs channels.

The multiplexer of the instant invention provides a programmable interface within a controller containing six other functional units so that a subscriber may connect a variety of audio transducer at an analog port of the controller, connect a digital transducer at a time-multiplexed digital port, and connect a subscriber-programmable microprocessor at an external bus terminal of the controller. Through programming of the microprocessor, the subscriber can cause the multiplexer to establish bidirectional data flow between any of the ports and the line interface to the telecommunication network.

Among the functional units within the controller which can be interconnected via the multiplexer are of the instant invention a line interface unit which connects the controller via a pair of isolation transformers to the network transmission line; a data link controller which receives data channel information from the line interface unit and transmits subscriber-generated data channel information to the line interface unit for subsequent transmission over the network; a main audio processor which provides analog-to-digital and digital-to-analog conversion of the audio signals received at, and transmitted to, respectively, the analog port of the controller; a microprocessor interface which permits subscriber control of the function and data paths within the controller; and a serial data port of the multiplexer.

The multiplexer of the present invention as commanded by the subscriber via the external microprocessor, establishes data paths between several possible source and destinations including the line interface unit, the main audio processor, the microprocessor interface and the serial port. Furthermore, the subscriber-programmable multiplexer controls the time-multiplexing of the two voice/data serial channels.

DESCRIPTION OF THE PREFERRED EMBODIMENT

A. DSC Architecture

Figure 1:
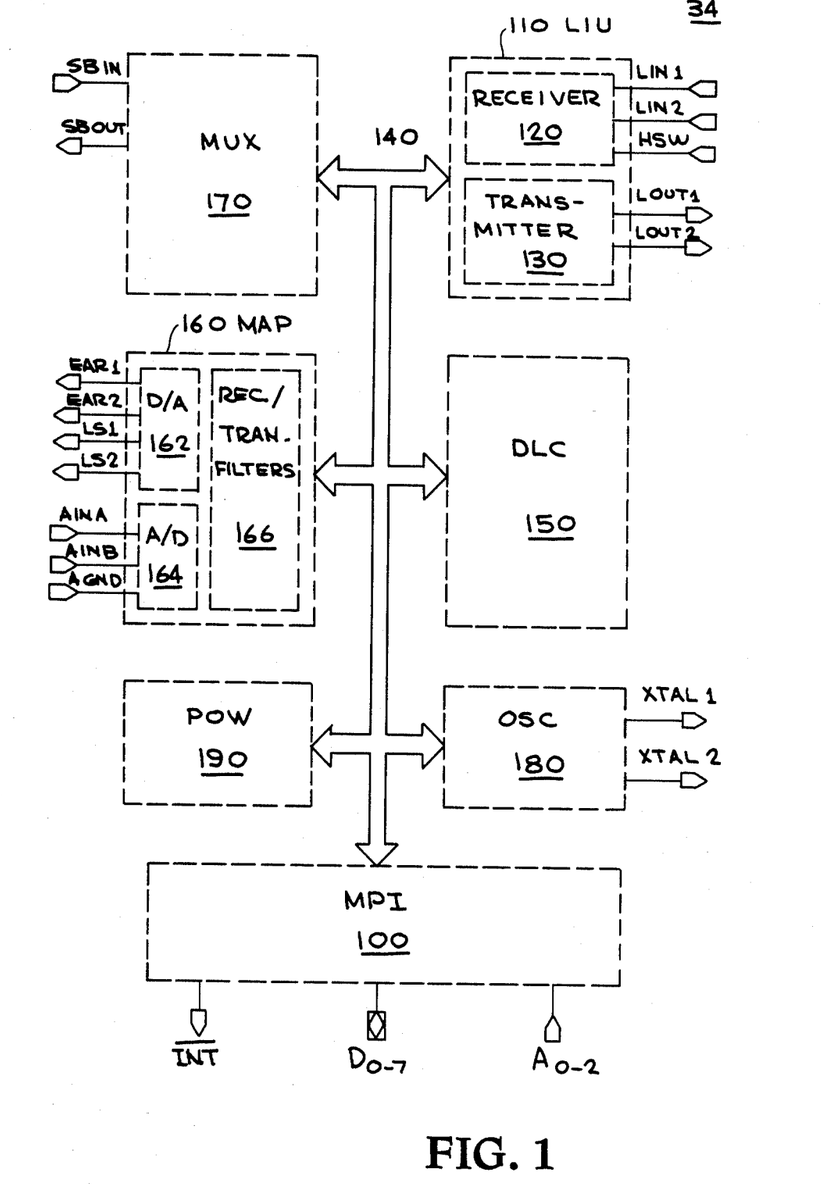
FIG. 1 is a functional block diagram of a digital subscriber controller (DSC) employing the programmable multiplexer of the instant invention.

The programmable multiplexer of the present invention is shown in an exemplary application within a digital subscriber controller (DSC) 34 consisting of seven functional blocks, as illustrated in FIG. 1. The DSC provides digital subscriber access to a telephone network. The DSC is compatible with the CGITT I-series recommendations at reference points "S" and "T". Accordingly, the user of the DSC according to the present invention may utilize terminal equipment (TE) which conforms to international standards.

The DSC 34 is the subject of U.S. Pat. No. 4,635,255, entitled "Digital Subscriber Controller", and assigned to the assignee of the instant application. A detailed description of the DSC 34 of FIG. 1, other than the programmable data-routing of the instant invention multiplexer shown thereon as MUX 170 is contained in the above-referenced copending application. The related, copending application is hereby incorporated by reference.

With reference to FIG. 1, DSC 34 provides a 192 kbs full-duplex digital path for bit-streams received via an isolation transformer (not shown) on a four-wire "S"interface at terminals LIN1 and LIN2, and transmitted on the four-wire interface from terminals LOUT1 and LOUT2. The DSC separates the received bit-stream into B1 and B2 channels (each 64 kbs), and D channel (16 kbs). The B channels are routed to different ones of the functional blocks illustrated in FIG. 1 under user control via the multiplexer 170 of the present invention. The D-channel is partially processed at the Level 2 in the DSC 34 and passed via a microprocessor interface (MPI) 100 to a programmable microprocessor (not shown) for additional processing. The DSC 34 supports both of the two major CCITT recommendations, "point-to-point" and "point-to-multipoint" subscriber configurations, to meet both PBX and public applications.

With reference to FIG. 1, the DSC 34 includes a line interface unit (LIU) 110, connected to the terminals LIN1 and LIN2, which contains a receiver section 120 and a transmitter section 130. The receiver section 120 consists of a receiver filter, a digital phase-lock loop (DPLL) for clock recovery, two slicers for detecting high marks and low marks of the incoming bit-stream frames, and a frame recovery circuit for frame synchronization.

Receiver 120 converts the incoming pseudo-ternary encoded bit stream into binary before conducting it to the other blocks of the DSC 34, illustrated in FIG. 1, via a bus 140. The receiver 110 also performs D-channel access protocol to resolve potential contention when the DSC 34 is operating in the "point-to-multipoint" configuration.

The transmitter section 130 consists of a binary-to-pseudo-ternary encoder and a line driver which receives signals on the bus 140 and causes an outgoing bit stream to be generated therefrom at the LOUT1 and LOUT2 terminals of the DSC 34. This outgoing bit stream is as specified in the CCITT recommendations for the "S"interface.

The LIU 110 conforms to the CCITT recommendations for level 1 activation and deactivation on the "S"interface. This is achieved by transmitting, and decoding, the standard CCITT "Info" signals. The LIU 110 is also responsive to a signal on a hook switch (HSW) terminal of the DSC 34. The HSW terminal receives a signal indicative of the off-hook or on-hook condition of the handset.

The DSC 34 also includes a data link controller (DLC) 150 connected to the bus 140 which partially processes the 16-kbs D-channel received via the LIU 110. The partial processing of the layer 2 of the protocol includes flag detection and generation, zero deletion and insertion, frame check sequency processing for error detection, and some addressing capability. The external microprocessor 38 initializes the DLC 150 and performs higher level protocol processing. When the DSC 34 is in the receive mode, D-channel data is conducted from the LIU 110 to the DSC 150, via bus 140, and then to the microprocessor interface (MPI) 100 for transmission from a set of eight data terminals (D0, D1, D2, D3, D4, D5, D6, and D7) of the DSC 34 to the external microprocessor. When the DSC is in the transmit mode, D-channel data is conducted from MPI 100 to the LIU 110 via DLC 150 for transmission on the D-channel over the "S"interface.

A main audio processor (MAP) 160 contained within the DSC 34 performs digital-to-analog (D/A) conversion within a D/A section 162 and analog-to-digital (A/D) conversion within an A/D section 164 and digital filtering of the signals present in the DLC 34 in a receive/transmit filters section 166. Analog audio signals can be applied to MAP portion of the DSC 34 at earphone terminals (EAR1 and EAR2), two general analog inputs (AINA, AINB, AGND) and analog voice signals are generated by the MAP portion at loudspeaker terminals (LS1 and LS2). The MAP 160 transmits and receives digital signals on the bus 140 carrying digital representations of audio signals received at the EAR1, EAR2, AINA, or AINB terminal or to be generated at the LS1 and LS2 terminals, respectively.

The data-routing multiplexer (MUX) 170 of the instant invention is externally programmable via the external microprocessor and, in response, controls the multiplexed bit-streams on the B1 and B2 channels which are received and transmitted to external peripheral devices from the DSC 34 at a serial-B input (SBIN) terminal of the DSC 34 and a serial-B output (SBOUT) terminal of the DSC 34, respectively. The MUX 170 can be programmed to establish a variety of different signal paths via the bus 140 having source and destinations, including: the SBIN terminals, the SBOUT terminal, the MPI 100, the LIU 110, and the MAP 160. The MUX 170 of FIG. 1 selectively routes the 64 kbs B1 and B2 channels among the MPI 100, and LIU 100, the LIU 110, and the MAP 160, with internal logical channels designated thereon as Ba (for the MAP), Bb and Bc (for the MPI), Bd, Be and Bf (for the B-serial port), and B1 and B2 (for the LIU). The D-channel data is routed to the DLC 150 directly from the LIU 110.

B. DSC Programmable Internal Bus Structure

The MUX 170 of the present invention contains three multiplexer control registers (MCR1, MCR2, and MCR3), which can be programmed via the MPI 100 to direct data flow along subscriber-selected bidirectional data paths shown functionally in FIG. 1 as bus 140.

B.1 Logical Bus Structure

Figure 2:
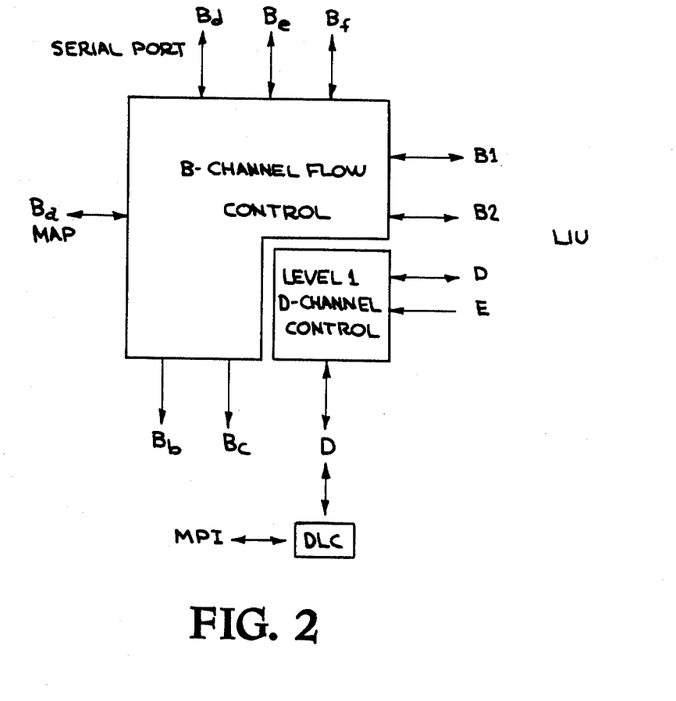
FIG. 2 illustrates the logical data bus structure of a DSC which can be configured by the multiplexer of the present invention by programming from an external microprocessor.

The MUX 170 can establish those bidirectional paths between the eight MUX logical ports B1, B2, Ba, Bb, Bc, Bd, Be, and Bf, shown in FIG. 2, as controlled by the contents of MCR1, MCR2, and MCR3. These MCRs are externally programmed to connect any two of the eight logical B-channel ports together by writing an appropriate channel code into the corresponding MCR. Each of the MCR1, MCR2, and MCR3 receives a pair of four-bit channel codes, which, in accordance with Table I, below, specifies the logical channel interconnections.

For instance, the assignment to MCR1 of the channel codes 0001 and 0100 would establish a didirectional channel connection of B1 and Bb. A loopback connection can be established by assigning the same pair of channel codes to a particular MCR. For instance, to effect a test of the MAP 160 portion of the DSC 34 by way of the analog output (EAR1 or EAR2) and the analog input (AINA or AINB) an assignment to MCR3 of the channel codes 0011 and 0011 would establish a loopback connection by MUX 170.

TABLE I
MCR1, MCR2, and MCR3 Channel Codes

| Code | Channel |
| --- | --- |
| 0000 | No connection |
| 0001 | B1 (LIU) |
| 0010 | B2 (LIU) |
| 0011 | Ba (MAP) |
| 0100 | Bb (MPI) |
| 0101 | Bc (MPI) |
| 0110 | Bd (Serial B Port Channel 1) |
| 0111 | Be (Serial B Port Channel 2) |
| 1000 | Bf (Serial B Port Channel 3) |

B.2 Internal Physical Bus Structure

Figure 3:
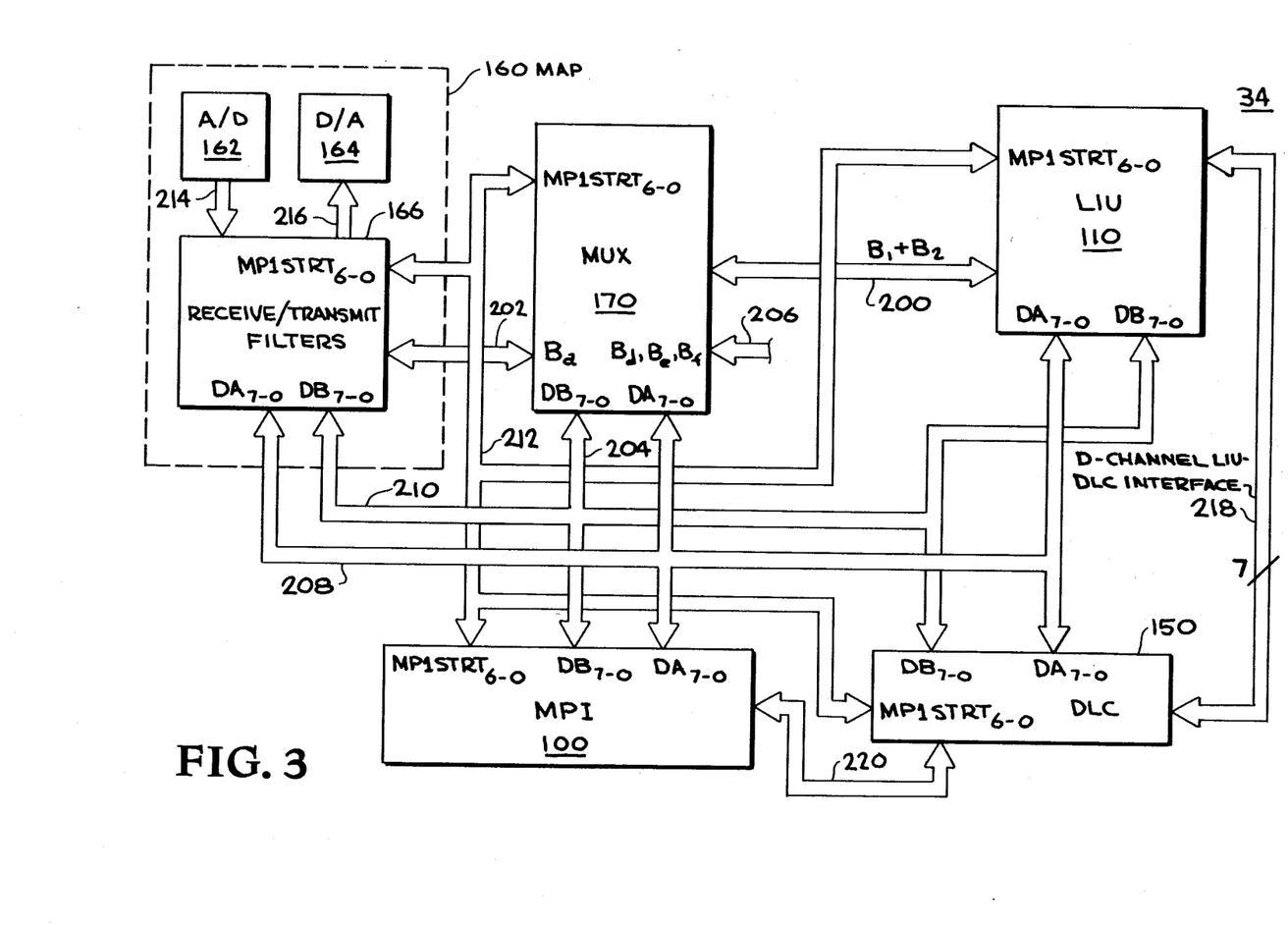
FIG. 3 illustrates the physical data bus structure internal to a DSC which can be configured by the multiplexer of the present invention by programming from an external microprocessor.

The bus structure internal to the DSC 34, shown functionally as bus 140 on FIG. 1 is illustrated in FIG. 3. Shown thereon are the B-channel bidirectional data paths B1 and B2, Ba, Bb and Bc, Bd, Be and Bf referred to in section B.1, above, designated 200, 202, 204 and 206, respectively, on FIG. 3. In addition, shown on FIG. 3 are three control busses 208, 210 and 212 which interconnect ports $DAS_{7-0}$, $DB_{7-0}$ and $MPISTR_{6-0}$, respectively of the MPI 100 with the ports $DA_{7-0}$, $DB_{7-0}$ and $MPISTRT_{6-0}$ of the LIU 110, the DLC 150, the receive/transmit filters 166 of MAP 160, and the MUX 170.

The contents of the MCR1, MCR2, and MCR3 registers determines the particular interconnection implemented on data busses 200, 202, 204 and 206, as described in Section B.1, above, in accordance with Table I. The manner in which the subscriber programs the MCR1, MCR2, and MCR3 registers, as well as the other user-accessible registers within the DSC 34 is described in Section C, below.

As shown in FIG. 3, an analog-to-digital (A/D) 162 section of MAP 160 is connected to the receive/transmit filters 166 section of MAP 160 by a bus 214, and a digital-to-analog (D/A) 164 section to the filters 166 by a bus 216. A D-channel bidirectional data path 218 interconnects LIU 110 and DLC 150 and a D-channel bidirectional data path 220 interconnects DLC 150 and MPI 100.

C. The Microprocessor Interface

The DSC 34 includes a number of programmable registers and filters which can be accessed via the microprocessor interface (MPI) 100. A detailed description of the MPI 100 is contained in the related, co-pending application entitled "Digital Subscriber Controller" referred to above, and is hereby incorporated by reference.

D. The Programmable Data-Routing Multiplexer

With reference to FIG. 2, the MUX 170 of the instant invention serves as a junction for the eight DSC 34 logical channels B1, B2, Ba, Bc, Bd, Be, and Bf shown thereon. Of these, Bd, Be and Bf form the serial port of the DSC 34 and are integral with the MUX 170. The subscriber can, as will be described below, cause the MUX 170 to route the information on any selected three of these logical channels, the "sources", to any other selected three logical channels, the "destinations".

The channels B1 and B2 are separated within the receiver 120 of the LIU 110 portion of the DSC 34 and received therefrom via bus 200 (FIG. 3) by MUX 170. Channels B1 and B2 are recombined by time-multiplexing within the transmitter 130 of the LIU 110 portion of the DSC 34 after reception via bus 200 from MUX 170. MUX 170 performs time-multiplexing and demultiplexing of the Bd, Be and Bf channels which form the serial port of the DSC 34.

The Ba channel is conducted to the MAP 160 portion of the DSC 34 and the Bb and Bc channels are conducted to the MPI 100 portion of the DSC 34. The programming of the MUX 170 is performed within the MPI 100 portion of the DSC 34 via the $DA_{7-0}$ 208 and $DB_{7-0}$ 210 control busses.

Figure 4:
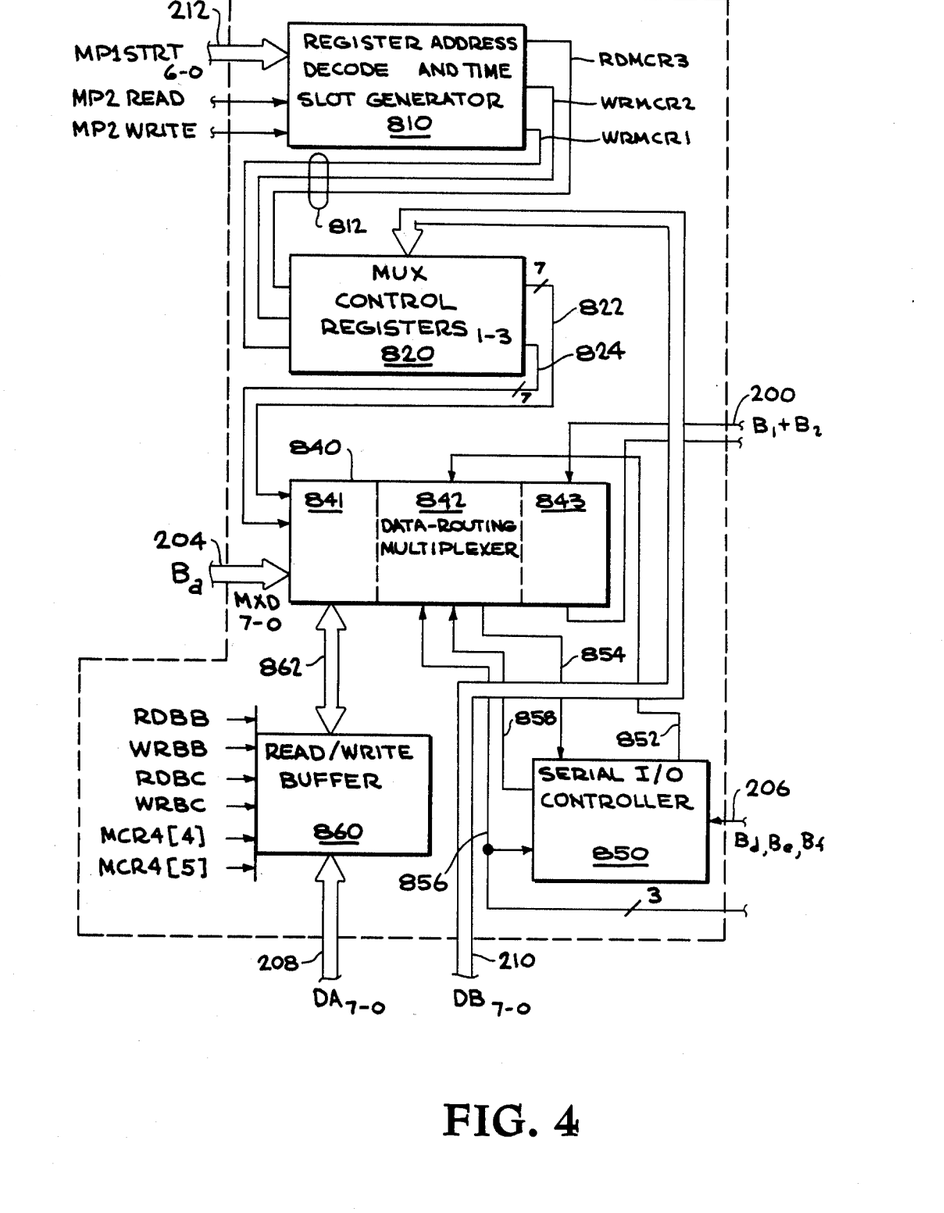
FIG. 4 is a block diagram of the programmable multiplexer 170 of the instant invention.

The architecture internal to the MUX 170 of the instant invention is illustrated in the block diagram of FIG. 4. As shown, the MUX 170 includes six major portions: a register address decode portion 810 receiving the multiplexer address signals $MP1STRT_{6-0}$ via bus 212 (FIG. 3) as well as multiplexer read and write MP2READ, MP2WRITE signals generated by MPI 100. Register address decode portion 820 generates read and write signals therefrom for the three multiplexer control registers (MCR1, MCR2 and MCR3). These signals are conducted from address decode 810 via six signal lines collectively denoted 812 to the portion of MUX 170 denoted 820 containing the multiplexer control registers MCR1-3, where they are used to read and write to MCR1-3, as will be described below.

The MCR1-3 also receive data control signals on the $DB_{7-0}$ bus 210 from the MPI 100 and the resulting sense and data control signals are conducted via a set of seven signal lines, collectively denoted as 822 and 824, respectively, to a data routing multiplexer portion 840 of MUX 170, where they are used to establish the data paths selected by the subscriber via the MPI 100 as will be explained below, in connection with the internal structure of the data routing multiplexer portion 840.

The data routing multiplexer 840 receives the data signals on time-division multiplexed B1 and B2 channels from LIU 110 via signal line 200. The data signals on the Bb and Bc channels are connected to the data routing multiplexer 840 from MPI 100 via the bidirectional $DA_{7-0}$ bus 208, as will be explained below, and the time-multiplexed serial data port 206 integral to the MUX 170 is connected to the data multiplexer 840 via a serial I/O controller 850 and two signal lines 852 and 854 leading from serial I/O controller 860 to data multiplexer 840. The LU1Tbf-e timing signals generated by the LIU 110 are conducted to the data routing multiplexer 840 and serial I/O controller 850 portions of MUX 170 via a set of three signal lines collectively denoted 856. MX1Tbe-f signals generated within serial I/O controller 850 are conducted to MUX 170 via a set of three signal lines collectively denoted 858. Data routing multiplexer 840 also receives Read Bb (RDBB), Write Bb (WRBB), Read Bc (RDBC) and Write Bc (WRBC) signals generated by the MPI 100.

A read/write buffer portion 860 of MUX 170 receives Bb and Bc time-multiplexed data signals on the $DA_{7-0}$ bus 208 from the MPI 100 which are conducted via a set of eight signal lines, denoted collectively as 862 to the data multiplexer portion of MUX 170, where they are used to establish the data paths selected by the subscriber via MPI 100 as will be explained below, in connection with the internal structure of the data routing multiplexer 840. Read/write buffer 860 receives the Read Bb (RDBB), Write Bb (WRBB), Read Bc (RDBC) and Write Bc (WRBC) signals generated by the MPI 100.

The construction and design of all the elements of MUX 170 shown in FIG. 4, other than the data routing multiplexer portion 840, is conventional and well known to those skilled in the art.

Figure 5A:
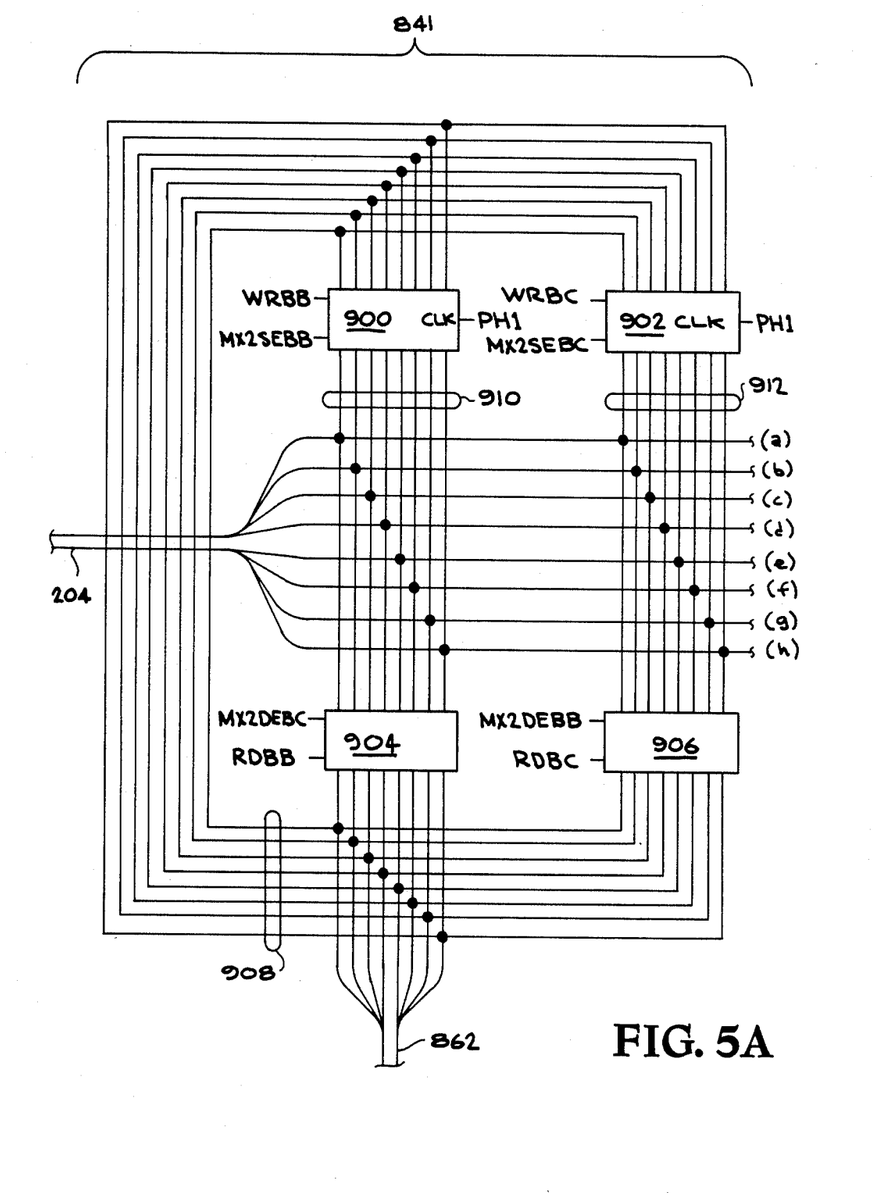
FIGS. 5a through 5c are block diagrams of the programmable data routing multiplexer 840 portion of the programmable multiplexer of the instant invention.
Figure 5B:
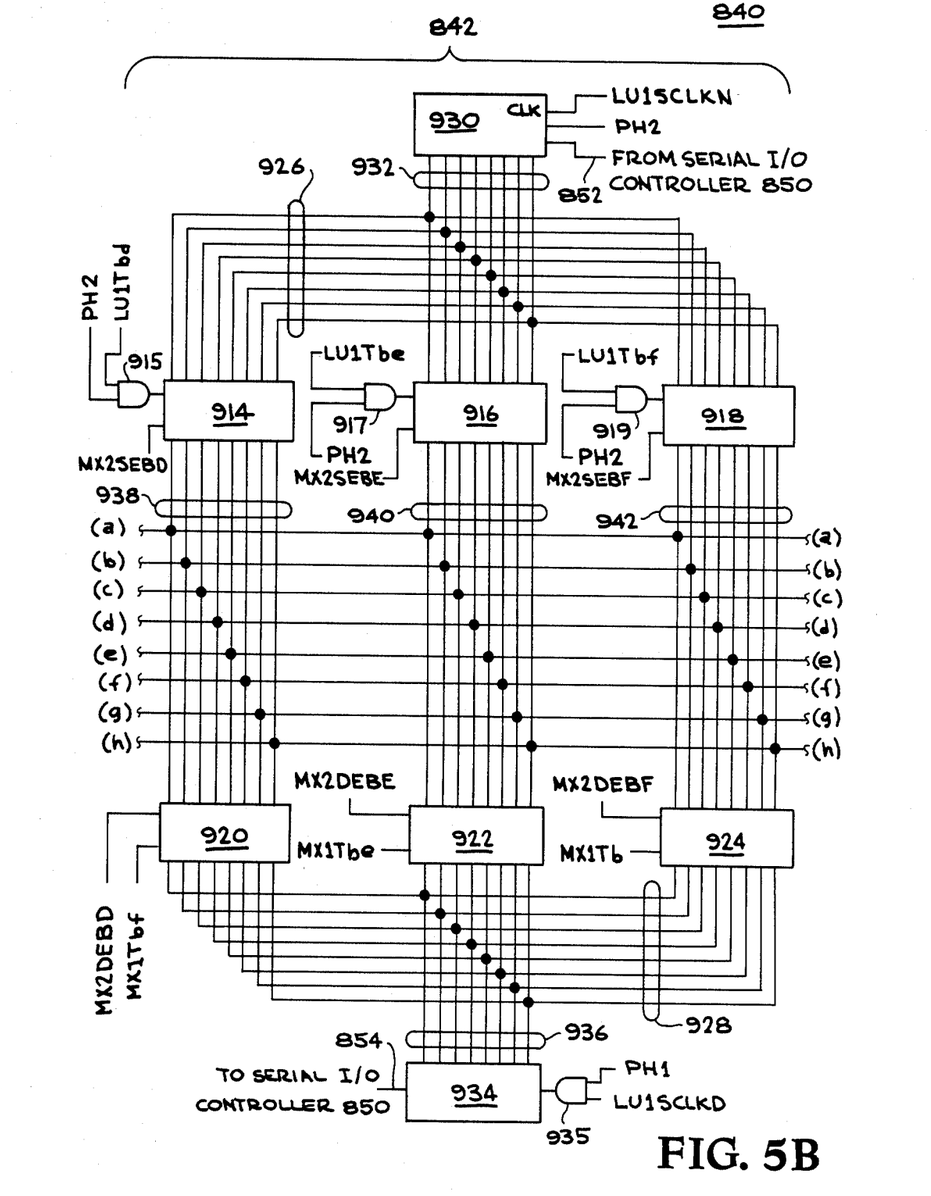
Figure 5C:
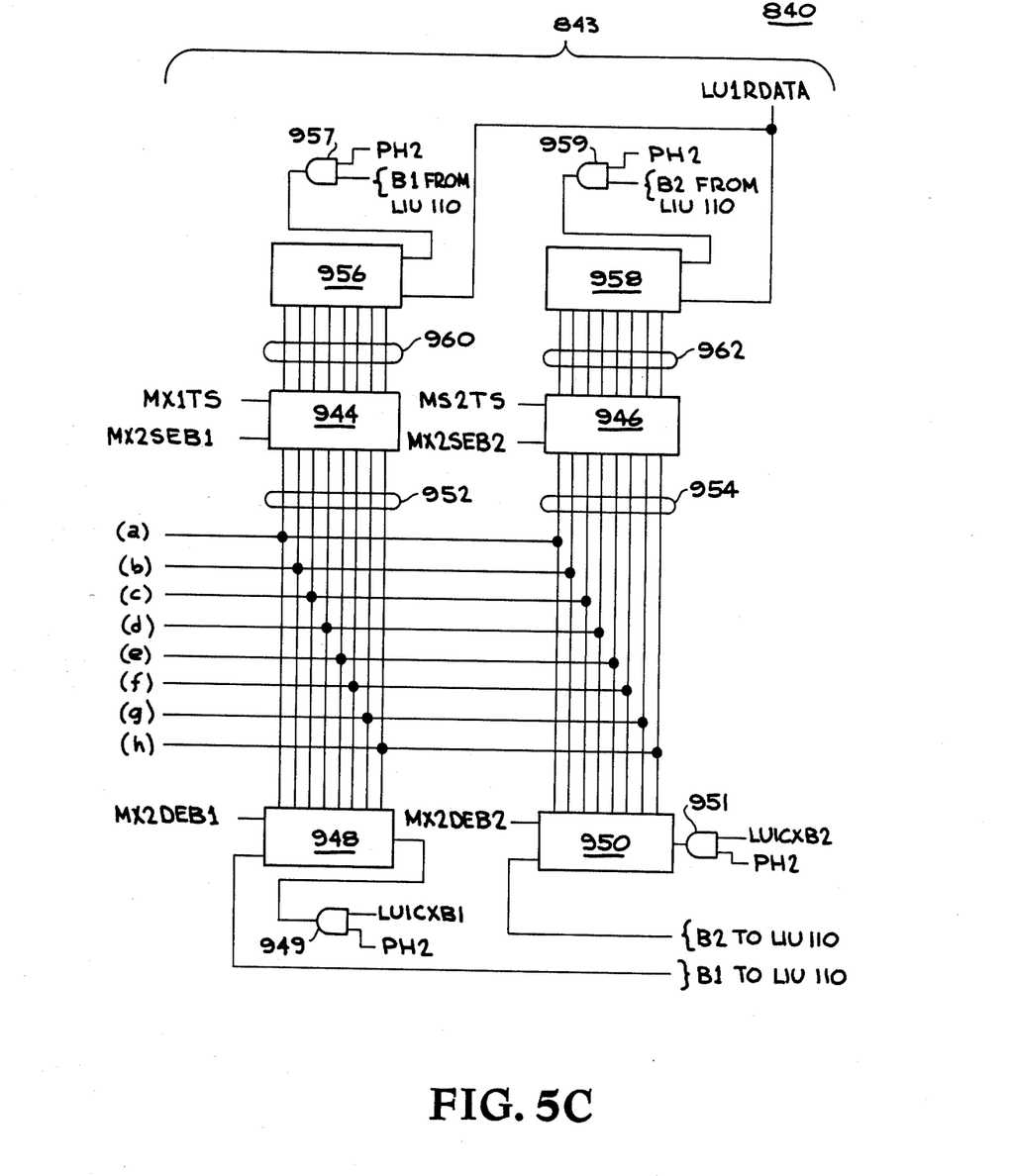

The architecture internal to the data routing multiplexer 840 of the present invention shown in FIGS. 5a, 5b and 5c consist of the three major sections generally denoted 841, 842 and 843, respectively thereon. The portion of the data routing multiplexer 840 denoted 841 comprises the MPI 100 interface portion consisting of channels Bb and Bc. The portion of the data routing multiplexer 840 denoted 842 comprises the integral serial port interface of the MUX 170 consisting of channels Bd, Be and Bf, and the portion denoted 843 comprises the LIU 110 interface portion consisting of channels B1 and B2. Those signal lines shown entering or leaving data routing multiplexer 840 vertically connect only to the portion 841, 842 or 843 shown, whereas the signal lines 822, 824 and 204 shown entering or leaving block 840 horizontally connect to all portions 841, 842 and 843, thereof.

As shown in FIG. 5a, the MPI interface 841 portion includes four eight-bit registers 900, 902, 904 and 906 which are connected in parallel via eight signal lines collectively denoted 908 which connect in a parallel manner to the eight bidirectional signal lines 862 (FIG. 4), which conduct signals on the $DA_{7-0}$ bus 208 via the read/write buffer 860. The eight write terminals (inputs) of registers 900 and 902 and the eight read terminals (outputs) of registers 904 and 906 are interconnected in this parallel manner. The eight read terminals (outputs) of registers 900 and 902 are connected in parallel to the write terminals (inputs) of registers 904 and 906, respectively, by eight signal lines collectively denoted 910 and 912, respectively. The eight signal lines 910 and 912 each connect in a parallel manner to the eight bidirectional signal lines of bus 204.

Registers 900 and 902 receive the MX2SEBB and MX2SEBC sense signals, respectively, generated by multiplexer control registers MCR1-3 820 and conducted to the data routing multiplexer 840 via signal lines 822. By appropriate time-division multiplexing performed within MCR1-3 block 820, the parallel eight bits of the Bb, or Bc, channel signal received on the $DA_{7-0}$ bus 208 from MPI 100 via read/write buffer 860 and bus 862, which has previously been written either to eight-bit register 900 or register 902, respectively, will be placed onto the eight-bit wide bus 204 via signal lines 910 or 912, respectively, for conveyance on that portion of bus 204 connected to the Ba channel of MAP 160 directly connected thereto. This eight-bit contents will also be made available to any of the channels Ba, Bc, Bd, Be, Bf, B1 or B2 which can be connected to the portion of the bus 204 shown in FIG. 5a as determined by the contents of MCR1–MCR3 820 as programmed by the subscriber in accordance with Table I above, as will be described hereinafter.

The parallel eight bits of the Bb, or Bc, channel signal received on the $DA_{7-0}$ bus 208 from MPI 100 via read/write buffer 860 and bus 862, will be written to register 900, register 902, respectively, upon application of the WRBB signal, WRBC signal, respectively, and upon application at a clock terminal 900 and 902 of a phase one (PH1) synchronizing clock generated by a master clock (not shown) within DSC 34.

In a similar manner, the eight-bit contents of registers 904 and 906 can be placed onto the $DA_{7-0}$ bus 208 via bus 862 and buffer 860 for conveyance to MPI 100 and their contents may be written from the eight-bit wide bus 204, under control of the RDBB or RDBC signals, respectively, and the MX2DEBC or MX2DEBB data enable signals, respectively.

By subscriber-programming of MCR1-MCR3 820 in accordance with Table I, above, the MPI interface 841 portion of data routing multiplexer 840 can establish bidirectional data paths including the Bb and Bc channels between the MPI 100 and the various other elements of the DSC 34 described in connection with FIG. 3, above.

The serial port interface 842 portion of data routing multiplexer 840 includes two sets of three eight-bit registers 914, 916 and 918; and 920, 922 and 924, each set of which is interconnected in parallel via eight signal lines collectively denoted 926 and 928, respectively, in FIG. 5b. The write terminals (inputs) to registers 914, 916 and 918 are interconnected in this parallel manner and connected in parallel to the eight output terminals of a serial-to-parallel register 930 via eight signal lines collectively denoted 932. The read terminals (outputs) of registers 920, 922 and 924 are likewise connected in parallel to each other as well as the eight input terminals of a parallel-to-serial register 934 via eight signal lines collectively denoted 936. The eight read terminals (outputs) of registers 914, 916 and 918 are connected in parallel to the eight write terminals (inputs) of registers 920, 922 and 924, respectively, by eight signal lines collectively denoted 938, 940 and 942, respectively. The eight signal lines 928, 940 and 942 each connect in a parallel manner to the eight bidirectional signal lines of bus 204.

Serial-to-parallel register 930 receives at an input terminal the incoming data on serial channels Bd, Be and Bf applied at the serial port 206 of MUX 170 and conducted therefrom via signal line 852 from serial I/O controller 850 which is connected to serial port 206. A synchronizing clock signal generated by LIU (LUISCLKN) portion 110 of DSC at the simultaneous application of a PH2 clock signal are applied to register 930 to provide synchronization of the serial signals applied to the input of register 930 with the generation of the eight parallel signals at the outputs of register 930 subsequently conducted via signal lines 932 to registers 914, 916 and 918. Parallel-to-serial register 934 receives at eight parallel inputs signals on signal lines 936 from registers 920, 922 and 924 from which are generated serial signals at an output terminal connected to serial I/O controller 850 via signal line 854. This outgoing data forms channels Bd, Be and Bf at serial port 206. A synchronizing clock signal generated by the LIU 100 (LUISCLKD) and the simultaneous application of a PH1 clock applied to AND gate 936 is, in turn, applied to register 934 to provide the synchronization of the parallel signals applied to the inputs of register 934 with the generation of the serial outputs thereof.

The operation of the serial port interface portion 842 of data routing multiplexer 840 is controlled by signals LUITbd, LUITbe and LUITbf and the PH2 clock applied to AND gates 915, 917 and 919 and sense signals MX2SEBD, MX2SEBE and MX2SEBF applied to registers 914, 916 and 918, respectively, to write to bus 204 from, or read from the serial port to, respectively, these registers, much as described in connection with the registers 900 and 902 of the MPI interface portion 841 of multiplexer 840. Signals MX1Tbf, MX1Tbe and MX1Tbd and data enable signals MX2DEBD, MX2DEBE and MX2DEBF applied to registers 920, 922 and 924, respectively, are used to read from bus 204, or write to the serial port, respectively, from these registers, much as described in connection with the registers 904 and 906 of the MPI interface 841.

The LIU interface portion 843 (FIG. 5a) of data-routing multiplexer 840 includes a set of two eight-bit registers 944 and 946, and a set of two parallel-to-serial registers 948 and 950. The eight read terminals (outputs) of registers 944 and 946 are connected in parallel to the eight write terminals (inputs) of parallel-to-serial registers 948 and 950, respectively, by eight signal lines collectively denoted 952 and 954, respectively. The eight signal lines 952 and 954 each connect in a parallel manner to the eight bidirectional signal lines of bus 204. The eight write terminals (inputs) of registers 944 and 946 are connected in parallel to the eight output terminals of serial-to-parallel registers 956 and 958, respectively, via a set of eight serial lines collectively denoted 960 and 962, respectively.

Serial-to-parallel registers 956 and 958 receive at an input terminal the incoming data on serial channel B1 and B2, respectively, conducted to the MUX 170 from LIU 110 signal lines 100. A synchronizing clock signal (LUIRDATA) generated by the LIU 110 of DSC 34 is applied gated via AND gates 957 and 959, respectively, with the PH2 clock signal to registers 956 and 958 to provide synchronization of the serial signals applied to the input terminals of registers 956 and 958 with the generation of the eight parallel signals at the outputs of registers 956 and 958, respectively, subsequently conducted via signal lines 960 and 962, respectively, to registers 944 and 946, respectively.

Parallel-to-serial registers 948 and 950 receive clock signals (LU1CXB1 and LU1CXB2, respectively) generated by the LIU 110 gated via and gates 949 and 951, respectively, with the PH2 clock signal to provide synchronization of the eight parallel signals applied at their input terminals with the generation of the serial signals at the outputs of registers 948 and 950, respectively, and subsequently conducted via signal lines to form the outgoing data on serial channel B1 and B2, respectively, conducted via signal lines 100 to the LIU 110.

The operation of the LIU interface portion 843 of data routing multiplexer 840 is controlled by signals MX1T5 applied to registers 944 and 946 and sense signals MX2SEB1 and MX2SEB2 applied to registers 944 and 946, respectively, to write to bus 204 from, or read from the B1, B2, respectively, channel, much as described in connection with the registers 900 and 902 of the MPI interface portion 841 of multiplexer 840. Data enable signals MX2DEB1 and MX2DEB2 applied to registers 948 and 950, respectively, and clock signals LU1CXB1 and LU1CXB2 respectively, are used to read from bus 204, or write to the B1 channel, B2 channel, respectively, from these parallel-to-serial registers, much as described in connection with the registers 904 and 906 of the MPI interface 841.

By external programming of the MCR1-3 portion 820 of the MUX 170 in accordance with Table I, above, the sense enable signals and data enable signals, discussed in connection with the data routing multiplexer portion 840 of MUX 170, will be generated by MCR1-3 portion 820 and received by data routing multiplexer 840 via signal lines 822 and 824 which will establish a bidirectional data path between any three of the following 64 kbs logical channels as a source and any three as a destination: Ba via the portion of bus 204 connecting the MAP 160 to the remainder of bus 204 shown interconnecting all three portions 841, 842 and 843 of data routing multiplexer 840 in FIG. 4; Bd and Bc via the bus 862 interconnecting the MPI interface portion 841 and MPI 100; Bd, Be and Bf via the signal lines 852 and 854 interconnecting the serial interface portion 842 and the serial port integral with MUX 170; and B1 and B2 via the signal lines 200 interconnecting the LIU interface portion 843 and the LIU 110 of DSC 34.

Figure 6A:
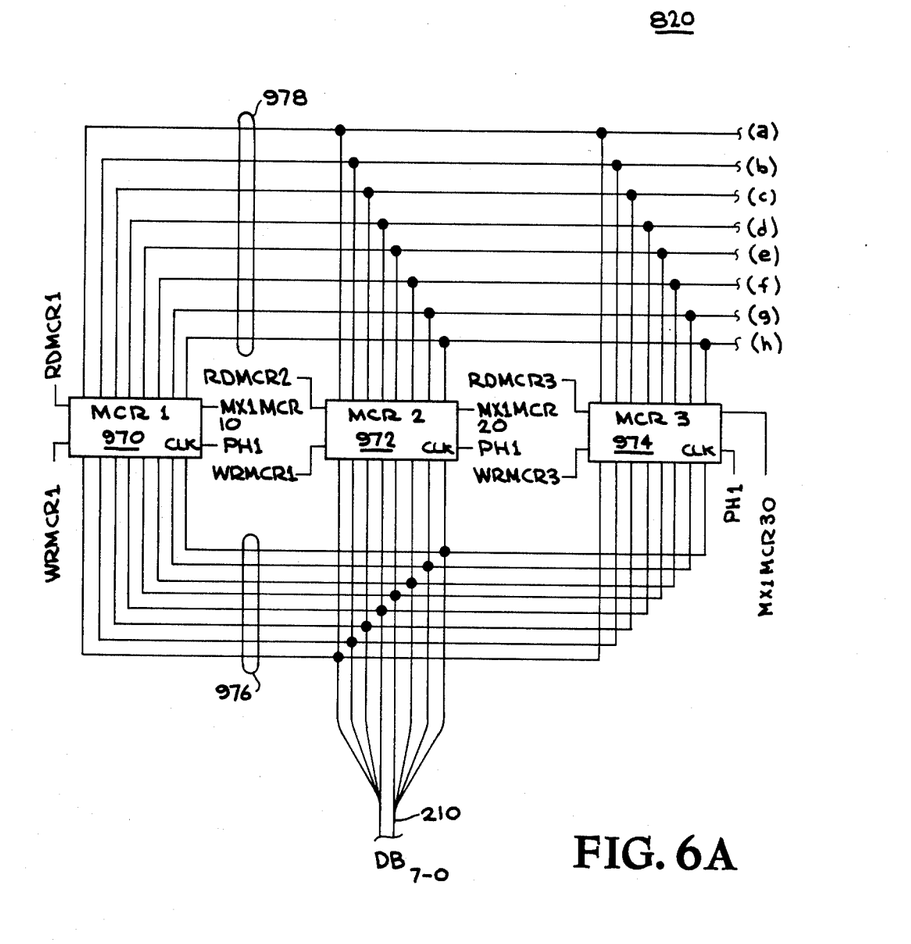
FIGS. 6a and 6b are logic diagrams of the MCR1-3 portion of the programmable data-routing multiplexer of the instant invention.
Figure 6B:
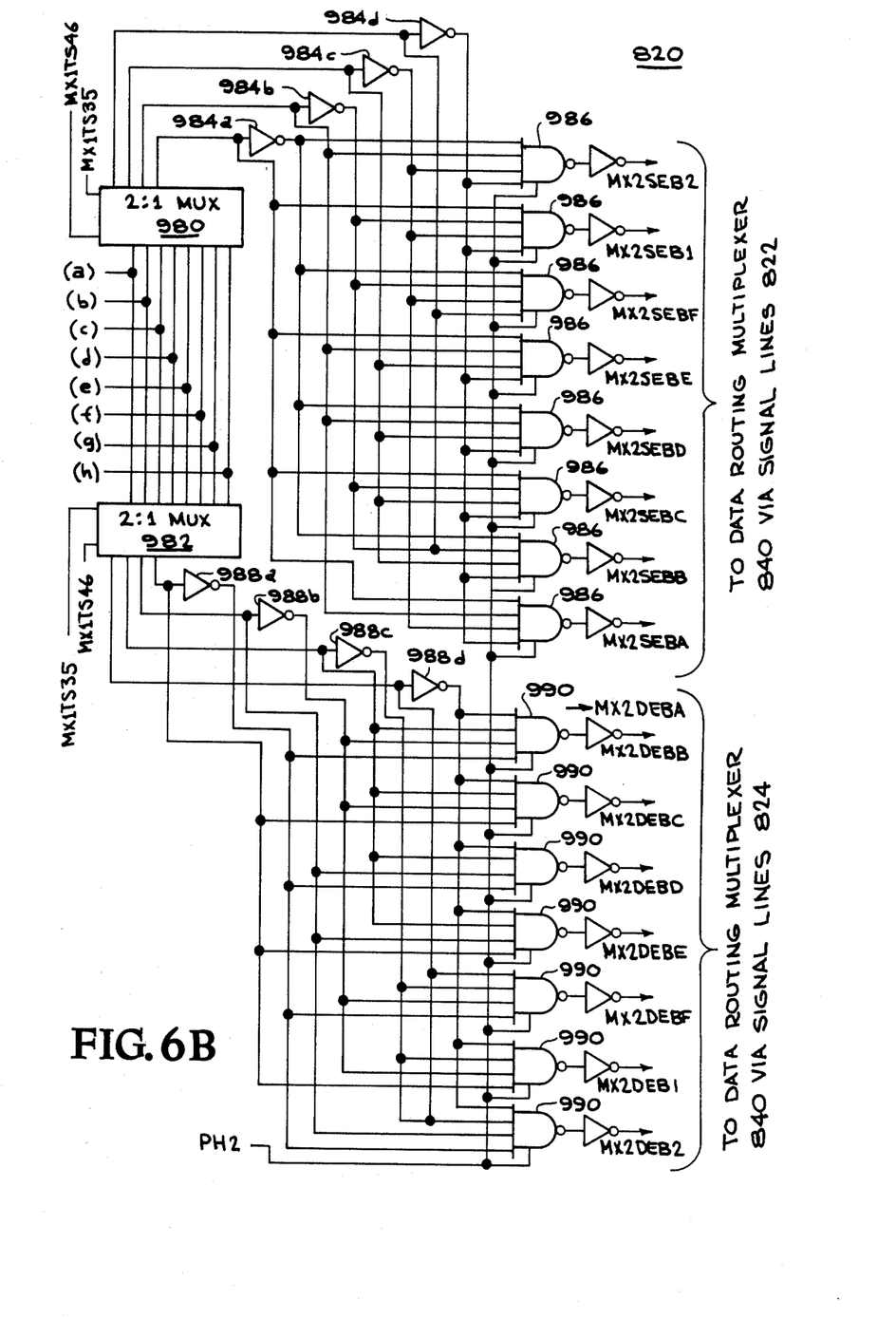

The source and destination selection is effected by the subscriber as will now be described in connection with the MCR1-3 portion 820 of MUX 170. Architecture internal to the MCR1-3 portion 820 is illustrated in FIGS. 6a and 6b. With reference to FIG. 6a, the set of three eight-bit multiplexer control registers (MCR1, MCR2, MCR3) 970, 972 and 974, respectively, are interconnected in parallel. Each of their eight write (input) terminals interconnected in a parallel fashion via a set of eight signal lines collectively denoted 976 and each of their eight read (output) terminals interconnected in a parallel fashion by a set of eight signal lines collectively denoted 978. The eight signal lines 976 also connected in a parallel fashion to the eight signal lines forming the bidirectional $DB_{7-0}$ bus 210 which is connected to the MPI 100.

The registers MCR1 970, MCR2 972, and MCR3 974, receive a Write enable and a read enable signal WRMCR1 and RDMCR1, WRMCR2 and RDMCR2, and WRMCR3 and RDMCR3, respectively, generated by the register address decode 810 portion of MUX 170, and received therefrom via signal lines 812.

A phase one (PH1) clock signal generated by a master clock section of the DSC 34 (not shown) is applied to a clock (CLK) enable input terminal of the MCR1-3, 970, 972 and 974. This PH1 signal is used to synchronize writing to the registers. Clock signals MX1MCR10, MX1MCR20 and MXMCR30 generated by a time slot generator portion of the decode 810 portion of MUX 170 are applied to a second clock enable input terminal of the MCR1, MCR2 and MCR3, respectively, to synchronize reading from the registers 970, 972 and 974, respectively.

With reference to FIG. 6b, the eight signal lines 978 are also connected in a parallel manner to the eight input terminals of a pair of 2:1 multiplexers 980 and 982. Multiplexer 980 has four output terminals which may be selectively interconnected in a parallel fashion to its four input terminals receiving the contents of the most-significant (ms) four bit positions of the MCR1-3 970, 972 and 974 or its four input terminals receiving the contents of the least-significant (ls) four bit positions of the MCR1-3 970, 972 and 974. Selection is time division multiplexed by the state of a binary-valued signals MX1TS135 and MX1TS246 generated by the time slot generator portion of decoder 810 applied to the multiplexer 780. In a similar manner, multiplexer 982 has four output terminals which can selectably be connected to the contents of the ms four bit positions of the MCR1-3 or their is four bit positions. Selection is time-division multiplexed as determined by the signals MX1TS135 and MX1TS246 so that when the ms four bits are selected for output on multiplexer 980, the ls four bits are selected for output on multiplexer 982, and, conversely when the ls four bits are selected for output on multiplexer 980, the ms four bits are selected for output on multiplexer 982.

As illustrated in FIG. 6b, the (true) signal at each output terminal of multiplexer 980 is conducted to an inverter 984a, 984b, 984c and 984d, respectively, and the true and complemented signals generated by multiplexer 980 are used within a one-of-eight combinational logic circuit comprising eight NAND gates 986a-g which generate a signal in accordance with the inputs consisting of certain ones of the true or complemented signals of the four ms or four ls bit positions of MCR1 970, MCR2 972 or MCR3 974 selected by multiplexer 980, as will be appreciated by those skilled in the art. The resulting signal generated by the NAND gates 986a-g is conducted to one of a set of eight inverters, the output signal generated by the inverter, being one of the sense enable signals MX2SEBB, MX2SEBC, MX2SEBD, MX2SEBE, MX2SEBF, MX2SEB1, and MX2SEB2, conducted via signal lines 822 to data-routing multiplexer portion 840 to establish the three bidirectional data paths described above.

A second one-of-eight combinatorial logic circuit comprising four inverters 988a-d, eight NAND gates 990a-f and eight inverters generates the seven data enable signals selected by multiplexer 982; MX2DEBB, MX2DEBC, MX2DEBD, MX2DEBE, MX2DEBF, MX2DEB1 and MX2DEB2, conducted via signal lines 824 to data-routing multiplexer 840 to establish the remaining three bidirectional/data paths. The result of MCR1-3 portion 820 of MUX 170 is to generate time-division multiplexed sense and data enable signals synchronized by the PH2 clock signal which reflect the subscriber's selection of data routing via the eight logical channels to be performed within MUX 170.

The MPI 100 generates address signals $MP1STRT_{6-0}$ on bus 212 which permit the subscriber's selection of the three-logical-channel-to-three-logical-channel interconnection described above to be entered into the three MCR1-3 registers 970, 972 and 974. Register address decode portion 810 of MUX 170 generates from $MP1STRT_{6-0}$ and the MP2READ and MP2WRIT2 signals generated by MPI 100, the WRMCR1, RDMCR1, WRMCR2, RDMCR2, and WRMCR3, RDMCR3 signals conducted to the MCR1, MCR2, and MCR3 registers, respectively, via signal lines 812. These MCR1-3 write and read signals permit the routing information generated by the subscriber and passed therefrom to the data-routing multiplexer 840 from MPI 100 via the $DB_{7-0}$ bus 210 to be entered into the appropriate MCR1-3 register in response to the WRMCR1, WRMCR2 and WRMCR3 signal generated by decode 810, as will be appreciated by those skilled in the art. Time-division multiplexer signals MX1MCR10, MX1MCR20 and MX1MCR30 generated internally within the time-slot generator portion of decode 810 and applied to MCR1, MCR2 and MCR3, respectively, cause the data-routing information on bus 210 to be entered to via signal lines 976, or sensed from via signal lines 978, a given MCR register only during its allocated time-division slot.

The contents of the ms four bits of each MCR1-3 register 970, 972 and 974 signify the logical channel source, in accordance with the code shown in Table I, above, and the ls four bits signify the logical channel destination, again, in accordance with Table I. The subscriber's selection of data-routing among the channels will accordingly be entered into MCR1, MCR2 and MCR3 via MPI 100 and the time-division multiplex data enable and sense enable signals MX2DEBB, MX2DEBC, MX2DEBD, MX2DEBE, MX2DEBF, MX2DEB1, MX2DEB2 and MX2SEBB, MX2SEBC, MX2SEBD, MX2SEBE, MX2SEBF, MX2SEB1, MX2SEB2 generated by MCR1-MCR3 portion 820 of MUX 170 will cause the registers 900, 902, 914, 916, 918, 944, 946, respectively, and registers 904, 906, 920, 922, 924, 948, 950, respectively, to transfer data to and from, respectively, that portion of bus 204 shown in FIG. 5a, implementing the three subscriber-selected source and destinations, as described in connection with the data routing multiplexer 840, above.

We claim:

1. A programmable multiplexer for use in a digital subscriber controller having clock means for generating timing signals and a plurality of interface means for connecting analog and digital device to said controller, including control logic and microprocessor interface means responsive to subscriber commands for generating control signals representative of subscriber-selected source-destination combinations, said source and said destination being subscriber-selected ones of said plurality of interface means, said programmable multiplexer comprising:

control register means responsive to said control signals generated by said control logic and microprocessor interface means for generating a plurality of time-division-multiplexed data-routing signals therefrom, indicative of said subscriber-selected sources and destinations, each said time-division of said data-routing signal comprising a time-multiplexed source portion and a destination portion; and data-routing multiplexer means connected to said plurality of interface means and responsive to said time-division multiplexed data-routing signals for establishing a time-division multiplexed data path between each said subscriber-selected source-destination combination.

2. A programmable multiplexer according to claim 1 wherein said data-routing multiplexer means portion of said controller is connected to a predetermined one of said interface means via a data bus, said data bus having a portion internal to said data-routing means; and wherein said data-routing multiplexer means includes a first plurality of plural-bit register means each having a plurality of input terminals and a plurality of output terminals, a predetermined first plurality of said first register means connected at their input terminals in parallel with the output terminals of a predetermined second plurality of said register means and in parallel to said control logic and microprocessor interface means; each of said registers of said first plurality of said register means connected at its output terminals in parallel with the input terminals of a predetermined one of said registers of said second plurality of said register means and in parallel to said data bus portion internal to said data-routing multiplexer means; each said register means having a control terminal connected to said control register means and responsive to said time-division multiplexed data-routing signals, said first plurality of register means for storing in parallel data received from said control logic and microprocessor means and generating said data on said data bus in response to reception of predetermined ones of said data-routing signals, and said second plurality of register means for storing in parallel data received from one of said subscriber-selected interface means via said data bus portion internal to said data-routing multiplexer means and generating said data to said control logic and microprocessor interface means in response to reception of predetermined ones of said data-routing signals.

3. A programmable multiplexer according to claim 1 wherein said controller has a first serial interface means, wherein said data-routing multiplexer means portion of said controller is connected to a predetermined one of said interface means via a data bus, said data bus having a portion internal to said data-routing means and wherein said data-routing multiplexer means includes: serial-to-parallel register means having an input terminal connected to said first serial interface means and a plurality of output terminals responsive to said clock means for generating in parallel at said output terminals data signals representative of time-multiplexed serial signals applied at said input terminal time-multiplexed signals representative of parallel data signals applied at said input terminals, a second plurality of plural-bit register means each having a plurality of input terminals and a plurality of output terminals, a predetermined first plurality of said second register means connected at their input terminals in parallel with the output terminals of said serial-to-parallel register means, a predetermined second plurality of said second register means connected at their output terminals in parallel with the input terminals of said parallel-to-serial register means, each of said registers of said first plurality of said second register means connected at its output terminals in parallel with the input terminals of a predetermined one of a said register means of said second plurality of said second register means and in parallel to said data bus portion internal to said data-routing multiplexer means, each said register means of said second plurality of register means having a control terminal connected to said control register means and responsive to said time-division multiplexed data-routing signals, said first plurality of said second register means for storing in parallel data received from said serial interface means and generating said data on said data bus in response to reception of predetermined ones of said data-routing signals, and said second plurality of said second register means for storing in parallel data received from one of said subscriber-selected interface means via said data bus portion internal to said data-routing means and generating said data to said serial interface means in response to reception of predetermined ones of said data-routing signals.

4. A programmable multiplexer according to claim 1 wherein said controller has a plurality of serial interface means, wherein said data-routing multiplexer means portion of said controller is connected to a predetermined one of said interface means via a data bus, said data bus having a portion internal to said data-routing means, and wherein said data-routing multiplexer means includes a plurality of serial-to-parallel register means each having an input terminal connected to a predetermined one of said serial interface means and a plurality of output terminals, responsive to said clock means, for generating in parallel at said output terminals data signals representative of time-multiplexed serial signals applied at said input terminal, a plurality of parallel-to-serial register means each having an output terminal connected to a predetermined one of said serial interface means and a plurality of input terminals, responsive to said clock means, for generating at said output terminal time-multiplexed signals representative of parallel data signals applied at said input terminals, a third plurality of plural-bit register means each having a plurality of input terminals and a plurality of output terminals, each of a predetermined first plurality of said third register means connected at their input terminals in parallel with the output terminals of a predetermined one of said serial-to-parallel register means, each of a predetermined second plurality of said third register means connected at their output terminals in parallel with the input terminals of a predetermined one of said parallel-to-serial register means, each of said registers of said first plurality of third register means connected at its output terminals in parallel with the input terminals of a predetermined one of said register means of said second plurality of said third register means and in parallel to said data bus portion internal to said data-routing multiplexer means, each said register means of said third plurality of register means having a control terminal connected to said control register means and responsive to said time-division multiplexed data-routing signals, each of said register means of said first plurality of said third register means for storing in parallel data received from predetermined one of said serial interface means and generating said data on said data bus in response to reception of predetermined ones of said data-routing signals, and said second plurality of said third register means for storing in parallel data received from one of said subscriber-selected interface means via said data bus portion internal to said data-routing multiplexer means and generating said data to predetermined one of said serial interface means in response to reception of predetermined ones of said data-routing signals.

5. A programmable multiplexer according to claim 1 wherein said data-routing multiplexer means portion of said controller is connected to a predetermined one of said interface means via a data bus, said data bus having a portion internal to said data-routing multiplexer means, wherein said controller has a plurality of serial interface means, including a first serial interface means, and wherein said data-routing multiplexer means includes:

a first plurality of plural-bit register means each having a plurality of input terminals and a plurality of output terminals, a predetermined first plurality of said first register means connected at their input terminals in parallel with the output terminals of a predetermined second plurality of said register means and in parallel to said control logic and microprocessor interface means; each of said registers of said first plurality of said register means connected at its output terminals in parallel with the input terminals of a predetermined one of said registers of said second plurality of said register means and in parallel to said data bus portion internal to said data-routing multiplexer means; each said register means having a control terminal connected to said control register means and responsive to said time-division multiplexed data-routing signals, said first plurality of register means for storing in parallel data received from said control logic and microprocessor means and generating said data on said data bus in response to reception of predetermined ones of said data-routing signals, and said second plurality of register means for storing in parallel data received from one of said subscriber-selected interface means via said data bus portion internal to said data-routing multiplexer means and generating said data to said control logic and microprocessor interface means in response to reception of predetermined ones of said data-routing signals;

serial-to-parallel register means having an input terminal connected to said first serial interface means and a plurality of output terminals responsive to said clock means for generating in parallel at said output terminals data signals representative of time-multiplexed serial signals applied at said input terminal time-multiplexed signals representative of parallel data signals applied at said input terminals, a second plurality of plural-bit register means each having a plurality of input terminals and a plurality of output terminals, a predetermined first plurality of said second register means connected at their input terminals in parallel with the output terminals of said serial-to-parallel register means, a predetermined second plurality of said second register means connected at their output terminals in parallel with the input terminals of said parallel-to-serial register means, each of said registers of said first plurality of said second register means connected at its output terminals in parallel with the input terminals of a predetermined one of a said register means of said second plurality of said second register means and in parallel to said data bus portion internal to said data-routing multiplexer means, each said register means of said second plurality of register means having a control terminal connected to said control register means and responsive to said time-division multiplexed data-routing signals, said first plurality of said second register means for storing in parallel data received from said serial interface means and generating said data on said data bus in response to reception of predetermined ones of said data-routing signals, and said second plurality of said second register means for storing in parallel data received from one of said subscriber-selected interface means via said data bus portion internal to said data-routing multiplexer means and generating said data to said serial interface means in response to reception of predetermined ones of said data-routing signals; and a plurality of serial-to-parallel register means each having an input terminal connected to a predetermined one of said serial interface means and a plurality of output terminals, responsive to said clock means, for generating in parallel at said output terminals data signals representative of time-multiplexed serial signals applied at said input terminal, a plurality of parallel-to-serial register means each having an output terminal connected to a predetermined one of said serial interface means and a plurality of input terminals, responsive to said clock means, for generating at said output terminal time-multiplexed signals representative of parallel data signals applied at said input terminals, a third plurality of plural-bit register means each having a plurality of input terminals and a plurality of output terminals, each of a predetermined first plurality of said third register means connected at their input terminals in parallel with the output terminals of a predetermined one of said serial-to-parallel register means, each of a predetermined second plurality of said third register means connected at their output terminals in parallel with the input terminals of a predetermined one of said parallel-to-serial register means, each of said registers of said first plurality of third register means connected at its output terminals in parallel with the input terminals of a predetermined one of said register means of said second plurality of said third register means and in parallel to said data bus portion internal to said data-routing multiplexer means, each said register means of said third plurality of register means having a control terminal connected to said control register means and responsive to said time-division multiplexed data-routing signals, each of said register means of said first plurality of said third register means for storing in parallel data received from predetermined one of said serial interface means and generating said data on said data bus in response to reception of predetermined ones of said data-routing signals, and said second plurality of said third register means for storing in parallel data received from one of said subscriber-selected interface means via said data bus portion internal to said data-routing multiplexer means and generating said data to predetermined one of said serial interface means in response to reception of predetermined ones of said data-routing signals.

6. A programmable multiplexer according to claim 1 wherein said control register means comprises:

register address decode and time slot generator means responsive to said clock means first address control signals generated by said control logic and microprocessor interface means for generating therefrom a plurality of read multiplexer control register (RMCR) signals and a plurality of write multiplexer control register (WMCR) signals; and addressable multiplexer control register means responsive to said RMCR and WMCR signals generated by said register address decode and time slot generator means conducted therefrom to said plurality of multiplexer control registers and further responsive to second code control signals generated by said control logic and microprocessor interface means, for generating therefrom said time-division-multiplexed data-routing signals representative of said subscriber-selected source-destination combinations.

7. A programmable multiplexer according to claim 6 wherein said multiplexer control register means receives said second code control signals from said control logic and microprocessor interface means via a control bus, said multiplexer control register means including:

a plurality of addressable multiplex control plural-bit register means each having a plurality of input terminals and a plurality of output terminals, interconnected in parallel at their output terminals, and interconnected in parallel at their input terminals and to said control bus, each said register means responsive to a predetermined one of a said RMCR and WRMC signals and to said clock means, for storing in parallel in said multiplex control register means having the address represented by a predetermined WMCR signal said second code control signals received from said control logic and microprocessor means and for generating said code control signals on said parallel output terminals time-multiplexed code control signals in response to reception of predetermined ones of said clock signals and predetermined RMCR signal;

a plurality of two-to-one multiplexer means each having a plurality of input terminals connected in parallel with said parallel interconnection of said output terminals of said multiplex control register means and each having a plurality of output terminals each responsive to multiplex control signals applied at a control terminal thereof, for selectably generating at said output terminals the signals applied at a predetermined first plurality of said input terminals or the signals applied at a predetermined second plurality of said input terminals; and data-routing signal generating means connected to said two-to-one multiplexer means for generating said time-division multiplexed data-routing signals representative of said subscriber-selected source-destination combinations.

8. A programmable multiplexer according to claim 7 wherein said controller is connected to at least a first, second, third, fourth, fifth, sixth, seventh and eight interface means, wherein said addressable plural-bit multiplex control register means comprise at least three registers each capable of storing eight binary digits (bits) each register having eight input terminals and eight output terminals, wherein said two-to-one multiplexer means each having eight input terminals arranged in a most-significant to a least-significant terminal and four output terminals and can selectably generate at said four output terminals the signals applied at said four most-significant input terminals or at said four least-significant input terminals, and wherein said time-division multiplexed data-routing signal generated by said data-routing signal generating means are in accordance with the following relationship:

| Second Code Control Signal | Subscriber-Selected Source/Destination |
| --- | --- |
| 0000 | No Connection |
| 0001 | First Interface Means |
| 0010 | Second Interface Means |
| 0011 | Third Interface Means |
| 0100 | Fourth Interface Means |
| 0101 | Fifth Interface Means |
| 0110 | Sixth Interface Means |
| 0111 | Seventh Interface Means |
| 1000 | Eighth Interface Means | whereby an eight-bit signal comprising a first four-bit portion being one of said second code control signals and a second four-bit portion being one of said second code signal generated by said control logic and microprocessor interface means is stored in one of said addressable control registers and said first four-bit portion is conveyed to said data-routing signal generating means via said two-to-one multiplexer means causing said data-routing from said subscriber selected source corresponding to said first code control stored in said most-significant portion of said control register and said second four-bit portion in a subsequent time-division is conveyed to said data-routing signal generating means via said two-to-one multiplexer means causing said data-routing to said subscriber-selected destination corresponding to said second code control stored in said least-significant portion of said control register.

* * * * *